(12) United States Patent
Gupta et al.

(10) Patent No.: US 6,243,680 B1
(45) Date of Patent: Jun. 5, 2001

(54) METHOD AND APPARATUS FOR OBTAINING A TRANSCRIPTION OF PHRASES THROUGH TEXT AND SPOKEN UTTERANCES

(75) Inventors: Vishwa Nath Gupta, Brossard; Michael Sabourin, St. Lambert, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/094,653

(22) Filed: Jun. 15, 1998

(51) Int. Cl.$^7$ .................................................. G10L 13/00

(52) U.S. Cl. ........................................ 704/260; 704/258

(58) Field of Search ............................................. 704/260

(56) References Cited

U.S. PATENT DOCUMENTS

| | | |
|---|---|---|
| 4,164,025 | 8/1979 | Dubnowski et al. . |
| 4,751,737 | 6/1988 | Gerson et al. . |
| 4,797,910 | 1/1989 | Daudelin . |

(List continued on next page.)

OTHER PUBLICATIONS

Matthew Lennig and Jean–Paul Brassard, Machine–Readable Phonetic Alphabet for English and French, 1984, pp. 165 and 166, Elsevier Science Publishers B.V. (North Holland).

Neena Jain, Ronald Cole and Etienne Barnard, Creating Speaker–Specific Phonetic Templates with a Speaker–Independent Phonetic Recognizer: Implications for Voice Dialing, 1996, p 881 to 884.

R. Haeb–Umbach, P. Beyerlein, E. Thelen, Automatic Transcription of Unknown Words in a Speech Recognition System, 1995 IEEE, P 840 TO 843.

V.N. Gupta, M. Lennig, P. Mermelstein, Fast Search Strategy in a Large Vocabulary Word Recognizer, Dec. 1988, P 2007 to 2018.

Helmer Strik, Catia Cucchiarini, Modeling Pronunciation Variation for ASR: Overview and Comparison of Methods, Rolduc, May 4–6, 1998, P 137 to144.

Trym Holter and Torbjorn Svendsen, Maximun Likelihood Modelling of Pronunciation Variation, Rolduc, May 4–6, 1998, P 63 to 66.

Gao Yu–qing, Chen Yong–bin, Wu Bo–xiu, Dynamic Adaptation of Hidden Markov Model for Robust Speech Recognition, 1989 IEEE, P 1336 to 1339.

Matthew Lennig and Douglas Sharp, Unleashing the Potential of Human–to–Machine Communication, Telesis, No. 97, P 23 to 27.

Matthew Linnig, Bell–Northern Research and INRS–Telecommunications, Putting Speech Recognition to Work in the Telephone Network, Aug. 1990 IEEE, P 35 to 39.

*Primary Examiner*—Fan Tsang
*Assistant Examiner*—Michael N. Opsasnick (57) ABSTRACT

A method and an apparatus for adding a new entry to a speech recognition dictionary, and more particularly a system and method for generating transcriptions from multiple utterances and a textual representation of a given word is provided. The method and apparatus combine acoustic information obtained from each of the training utterances to generate the most likely transcriptions. It also provides a method and apparatus for transcribing multiple utterances into a single transcription that can be added to a speech recognition dictionary. In a first step, a graph representative of possible pronunciation of the word or combination of words is generated on the basis of the textual representation of the word and a letter to phoneme set of rules. Phonemes perceptually close to the phonemes in the transcriptions obtained using the letter to phoneme rules are added on parallel branches in the generated graph. Following this, each branch in the graph is replaced with its allophones and the complete graph is scored using training utterances to obtain the most likely allophone sequence on the basis of the multiple utterances of the word.

54 Claims, 7 Drawing Sheets

U.S. PATENT DOCUMENTS

| | | |
|---|---|---|
| 4,959,855 | 9/1990 | Daudelin . |
| 4,979,206 | 12/1990 | Padden et al. . |
| 5,050,215 | 9/1991 | Nishimura . |
| 5,052,038 | 9/1991 | Shepard . |
| 5,086,479 | 2/1992 | Takenaga et al. . |
| 5,091,947 | 2/1992 | Ariyoshi et al. . |
| 5,097,509 | 3/1992 | Lennig . |
| 5,127,055 | 6/1992 | Larkey . |
| 5,163,083 | 11/1992 | Dowden et al. . |
| 5,181,237 | 1/1993 | Dowden et al. . |
| 5,204,894 | 4/1993 | Darden . |
| 5,268,990 * | 12/1993 | Cohen et al. ................. 704/200 |
| 5,274,695 | 12/1993 | Green . |
| 5,307,444 | 4/1994 | Tsuboka . |
| 5,333,275 * | 7/1994 | Wheatley et al. ................. 704/243 |
| 5,384,893 * | 1/1995 | Hutchins ................. 704/267 |
| 5,488,652 | 1/1996 | Bielby et al. . |
| 5,500,920 * | 3/1996 | Kupiec ................. 704/270 |
| 5,581,655 * | 12/1996 | Cohen et al. ................. 704/245 |
| 5,675,706 * | 10/1997 | Lee et al. ................. 704/256 |
| 5,682,501 * | 10/1997 | Sharman ................. 704/260 |
| 5,799,276 * | 8/1998 | Komissarchik et al. ................. 704/251 |
| 5,822,728 * | 10/1998 | Applebaum et al. ................. 704/254 |
| 5,825,977 * | 10/1998 | Morin et al. ................. 704/255 |
| 5,862,519 * | 1/1999 | Sharma et al. ................. 704/231 |
| 5,930,754 * | 7/1999 | Karaali et al. ................. 704/259 |
| 5,983,177 * | 11/1999 | Wu et al. ................. 704/244 |

* cited by examiner

METHOD AND APPARATUS FOR OBTAINING A TRANSCRIPTION OF PHRASES THROUGH TEXT AND SPOKEN UTTERANCES

FIELD OF THE INVENTION

This invention relates to a method and an apparatus for automatically performing desired actions in response to spoken requests. It is particularly applicable to a method and an apparatus for generating entries for a speech recognition dictionary, as may be used to automate partially or fully the training of a speech recognition dictionary in a speech recognition system. The method and apparatus may be used to train a speech recognition dictionary for a telephone directory assistance system, voice activated dialing (VAD), credit card number identification and other speech recognition enabled services.

BACKGROUND OF THE INVENTION

In addition to providing printed telephone directories, telephone companies provide information services to their subscribers. The services may include stock quotes, directory assistance and many others. In most of these applications, when the information requested can be expressed as a number or number sequence, the user is required to enter his request via a touch tone telephone. This is often aggravating for the user since he is usually obliged to make repetitive entries in order to obtain a single answer. This situation becomes even more difficult when the input information is a word or phrase. In these situations, the involvement of a human operator may be required to complete the desired task.

Because telephone companies are likely to handle a very large number of calls per year, the associated labour costs are very significant. Consequently, telephone companies and telephone equipment manufacturers have devoted considerable efforts to the development of systems that reduce the labour costs associated with providing information services on the telephone network. These efforts comprise the development of sophisticated speech processing and recognition systems that can be used in the context of telephone networks.

In typical speech recognition systems, the user enters his request using isolated word, connected word or continuous speech via a microphone or telephone set. The request may be a name, a city or any other type of information for which either a function is to be performed or information is to be supplied. If valid speech is detected, the speech recognition layer of the system is invoked in an attempt to recognize the unknown utterance. Typically entries in a speech recognition dictionary, typically including transcriptions associated to labels, are scored in order to determine the most likely match to the utterance.

In speech applications, it is desirable to create the speech recognition dictionary or to add entries to the speech recognition dictionary by simply providing sample utterances of a new word along with a textual representation of that word. For example, it may be required to add a new name and associated telephone to a voice activated dialing system. In another example, it may be desirable to add a new function in a robot control system instructing the robot to perform some new task. In order to achieve this, utterances of the new name or new function to add are gathered (typically 2 or 3 utterances). Based on these sample training utterances a new entry, generally comprising a transcription of the utterances, is created in the speech recognition dictionary and used for recognition purposes at a later time.

Traditionally, to get an accurate transcription of a spoken word, expert phoneticians listen to the words as they are spoken and transcribe them. This operation is time consuming and the labour costs associated with the expert phoneticians are significant. As a result systems providing automatic transcriptions to spoken words have been developed.

A common approach in generating the transcription for a new word is to obtain a series of training utterances of the same word and decode each of the utterances separately using a continuous allophone recogniser device. This approach generates a series of separate alternative acoustic sub-word representations each representation corresponding to different pronunciations of the same word. All these transcriptions are then stored in a speech recognition dictionary. Mathematically, this operation can be expressed as follows:

$$T_i = \arg\max P(t|Y_i) \qquad \text{Equation 1}$$

i=1, ..., p t∈T where $T_i$ is the transcription of the ith utterance, p is the number of training utterances, $\{Y_1, Y_2, Y_3, \ldots Y_p\}$ are the training utterances, T is the set of all possible transcriptions for any word and P(|) designates a conditional probability computation. A problem with this approach is that the computational cost of the recognition stage is very high since, for each word, the speech recognition system must score multiple entries in the dictionary. For a more detailed explanation, the reader is invited to consult R. Haeb-Umbach et al. "Automatic Transcription Of Unknown Words In A Speech Recognition System", Proc. Of ICASSP'95, pp.840–843, 1995 and N. Jain et al. "Creating Speaker-Specific Phonetic Templates With A Speaker-Independent Phonetic Recognizer: Implications For Voice Dialing", Proc. ICASSP'96, pp.881–884, 1996. The content of these documents is hereby incorporated by reference. A variant of this approach using a set of rules to automatically generate a set of likely transcriptions is described in "Automatic Rule-Based Generation of Word Pronunciation Networks" by Nick Cremelie and Jean-Pierre Martens, ESCA Eurospeech97, Rhodes, Greece, ISSN 1018-4074, pp. 2459–2462 whose contents are hereby incorporated by reference.

Another approach is to take the series of separate alternative transcriptions of the new word, generated as described in equation 1, and then select a single transcription which best represents all the utterances. Essentially, a transcription $T_{best}$ is chosen which is the most likely to have produced all utterances $\{Y_1, Y_2, Y_3, \ldots, Y_p\}$. Mathematically, this operation can be expressed as follows:

$$T_{best} = \arg\max_{t \in \{T_1, T_2, \ldots T_p\}} \left( \prod_{i=1}^{p} P(Y_i|t) \right) \qquad \text{Equation 2}$$

For a more detailed explanation, the reader is invited to consult R. Haeb-Umbach et al. "Automatic Transcription Of Unknown Words In A Speech Recognition System", Proc. Of ICASSP'95, pp.840–843, 1995 whose content is incorporated by reference. Choosing a single transcription for the new word reduces the memory space required for the dictionary and reduces the amount of time necessary to score the dictionary. However, the selected transcription merely reflects the acoustic information in the utterance that originated the transcription, and disregards the acoustic information of the utterances associated with the transcriptions that where rejected during the selection process.

Thus, there exists a need in the industry to refine the process of adding a new word to a speech recognition dictionary such as to obtain a more accurate representation for new entries and to reduce the computational costs at the recognition stage.

OBJECTS AND STATEMENT OF THE INVENTION

An object of the invention is to provide a method and apparatus that can be used for creating a transcription capable of being used to generate an entry in a speech recognition dictionary.

Another object of the invention is a computer readable storage medium containing a program element that instructs a computer to generate a transcription capable of being used to generate an entry in a speech recognition dictionary.

Another object of the invention is to provide an apparatus for creating an entry for a certain word in a speech recognition dictionary.

As embodied and broadly described herein the invention provides an apparatus for creating a transcription capable of being used to generate an entry in a speech recognition dictionary for a certain word, said apparatus comprising:

a first input for receiving an audio signal derived from an utterance of the certain word;

a second input for receiving data representative of an orthographic representation of the certain word;

processing means coupled to said first input and to said second input for processing the audio signal and the orthographic representation of the certain word to provide a transcription of the certain word.

For the purpose of this specification, the expression "word" designates a textual representation of a spoken utterance. In a specific example, a textual representation is a collection of written symbols or characters that are components of an alphabet.

For the purpose of this specification, the expressions "orthographic representation" and "orthography" are used interchangeably. An "orthography" is a data element in a machine readable form that is an electronic representation of a word. Typically, an orthography is a collection of symbols mapped to the characters, such as letters, forming the word. The expression "orthography" also includes data structures including solely or in part pointers or links to locations, such as in a memory for example, that contain the actual representation of the word.

For the purpose of this specification, the expression "utterance" is a sound or combination of sounds that form a meaningful linguistic unit.

For the purpose of this specification, the expression "transcription" is used to designate a machine readable data element that is a combination of symbols providing information on how a sub-word unit, such as a letter or a combination of letters, may be pronounced. Typically a word may have several transcriptions, where each transcription may be a different pronunciation of the word. The symbols that compose a transcription may be phonemes, allophones, triphones, syllables and dyads (demi-syllables). The expression "allophonic transcription" is used to designate a transcription where the sub-word units are allophones and the expression "phonemic transcription" is used to designate a transcription where the sub-word units are phonemes. A phonemic transcription may have multiple corresponding allophonic transcriptions. Although the definition of "transcription" herein refers to a data structure including symbols, it should be understood that what is meant is a data element having constituent parts that are representations of the symbols. The table below illustrates words (or orthographies) and the associated transcriptions.

| KEYWORD | TRANSCRIPTION |
|---|---|
| "COMPOSE" | < k1*4m6-p1o2z0> |
| "SLOW DOWN" | < s8l9o3_d1aw0n15> |

In the above table, each alphanumeric character in the transcription is an allophone. The character is a phoneme and the digits following the character indicate a variation of the phoneme in a certain acoustic context (allophone). The "_" character is the inter-word silence and "-" is the syllabic mark.

For the purpose of this specification, the expressions "model" and "speech recognition model" are used to designate a mathematical representation of a speech signal. Speech modeling is well-known in the art of speech recognition. Commonly used models in speech recognition are Hidden Markov Models (HMMs) where each phoneme can be represented by a sequence of states and transition in between these states. For basic information about HMMs the reader is invited to consult "An Introduction to Hidden Markov Models", L. R. Rabiner and B. H. Juang, IEEE ASSP Magazine, January 1986, pp.4–16 whose content is hereby incorporated by reference.

For the purpose of the specification, the expression "pronunciation" is used to designate the different manners in which a same word can be uttered. For example, a simple word like "a" is often pronounced as /ey/ in isolation but as /ax/ in context. Another example is a word like "data" which can be pronounced as /d ey t ax/ or /d æ t ax/ depending on the speaker's dialect.

For the purpose of this specification the expression "allophone" is used to designate the pronunciation of a phoneme placed in a certain context defined by the surrounding phones.

In a preferred embodiment of this invention, the apparatus for adding a new entry to a speech recognition dictionary is used in a dictionary training system to add an allophonic transcription relating to a word to a speech recognition dictionary. In a typical interaction, for each new word, the dictionary training system receives as input an orthographic representation of the word to be added along with a set of utterances, herein referred to as training utterances, representative of the word. The orthographic representation may be obtained from a dictionary unit comprising orthographic representation of words or from a user of the system through a keyboard or other suitable input means. Preferably, for each new word, 10 to 20 training utterances are used. Fewer or more training utterances may be used here without detracting from the spirit of the invention. Most preferably, the training utterances are selected from different individuals representative of the end users of the system without necessarily being users themselves. The dictionary training system processes the orthography and the training utterances to generate an allophonic transcription representative of acoustic information of all the training utterances. Once the addition of a new word has been initiated, the system first generates a graph on the basis of the orthographic representation of the word. The graph represents a plurality of possible ways of pronouncing the new word. The concept of a graph is well known in the art to which this invention pertains. Each branch in the graph corresponds to one sub-word unit preferably an allophone and is herein referred to as an allophonic graph. The input training utterances are converted by a preprocessing unit into a sequence of feature vectors or other suitable representation and are used to score the allophonic graph generated on the basis of the orthographic representation of the new word. Preferably a graph search algorithm is used to score the graph. For more information about a graph search, the reader is invited to consult V. N. Gupta et al. "Fast search strategy in a large vocabulary word recognizer", JASA 84(6), pp.2007–2017, Dec. 1988 whose content is hereby incorporated by reference. The most likely allophonic transcriptions of the word are introduced in the speech recognition dictionary and associated with a label corresponding the new word being added. In a preferred embodiment, a single allophonic transcription is introduced in the speech recognition dictionary, the allophonic transcription being characterized by a high likelihood score. Optionally, a label associated to each allophonic transcription is stored in the speech recognition dictionary. In a preferred embodiment, the label is the orthographic representation of the word.

In a preferred embodiment, the task of generating an allophonic graph is performed by a sequence of steps. The first step includes providing letter to phoneme rules to generate possible phonemic transcriptions of the new word to be added based on the received orthographic representation. The result of this step is a plurality of phonemic transcriptions representative of possible pronunciations of the new word on the basis of linguistic rules. For more information about letter to phoneme algorithms, the reader is invited to consult "Modeling Pronunciation Variation for ASR: Overview and Comparison of methods", Helmer Strik and Catia Cucchiarini, Workshop Modeling Pronunciation Variation, Rolduc, 4–6 May 1998 and "MaximumLikelihood Modelling of Pronunciation Variation", Trym Holter and Torbjorn Svendsen, Workshop Modeling Pronunciation Variation, Rolduc, 4–6 May 1998, pp.63–66 whose contents are hereby incorporated by reference. Following this, the second step includes turning the phonemic transcriptions into a graph where each phoneme in the transcription is associated to a branch. Preferably, for each branch in the graph, parallel branches are added representatives of phonemes perceptually close to this phoneme branch. Perceptually close phonemes are said to belong to a same partition. For example, for a branch labeled as phoneme /i/, a parallel branch for the front vowel /I/ is added. Following this, each phonemic branch is expanded by replacing it by its corresponding allophones in parallel.

In a preferred embodiment, the received training utterances are processed by a sequence of steps. A pre-processing unit converts each input training utterance into a sequence of feature vectors or other suitable representation. For example mel-based cepstral parameters may be used to compose the feature vectors. Feature vectors are well-known in the art to which this invention pertains. Following this, for each utterance, the allophonic graph is scored using a fast search algorithm and each branch is associated with a probability value. The L-best scoring allophonic transcriptions are then selected in order to obtain the most likely allophonic sequences. Finding the L best scores in a graph is well known in the art and for further information the reader is invited to consult "Fast search strategy in a large vocabulary word recognizer", V. Gupta et al., J. Acoust. Soc. Am. (1988), 84(6), pp. 2007–2017 whose content is hereby incorporated by reference. The L-best allophonic transcriptions are then introduced into the speech recognition dictionary. The L selected transcriptions are representative of acoustic information contained in all the training utterances. In a preferred embodiment, a single allophonic transcription (L=1) is introduced into the speech recognition dictionary. Optionally, each transcription may be associated with a label such as the orthographic representation of the word corresponding with the transcription.

In another preferred embodiment, the apparatus for adding a new entry to a speech recognition dictionary is used in a dictionary training system by adding multiple allophonic transcriptions of a new word. In a typical interaction, for each new word, the dictionary training system receives as input an orthographic representation of the word to be added along with utterances representative of the word. An allophonic graph is generated in the same fashion as described previously on the basis of the orthographic representation of the new word. Using clustering techniques, the training utterances are grouped into clusters and each group is processed separately. Clustering can be done automatically using the k-means algorithm or other well-known clustering algorithm. Clustering is well known in the art to which this invention pertains. Alternatively, heuristic clustering methods may also be used to divide the utterances into groups. Examples of heuristic clustering include separating utterances using male/female classification, native/non-native classification and so on. Preferably, for each cluster, about 10 to 20 training utterances are used. Fewer or more training utterances may be used here without detracting from the spirit of the invention. For each cluster, the allophonic graph generated on the basis of the orthographic representation of the new word is scored and for each cluster the top L scoring allophonic transcriptions are selected. The clustering process results in multiple allophonic transcriptions for each word. In a preferred embodiment a single allophonic transcription is selected (L=1) for each cluster. The allophonic transcription selected from each cluster is stored in the speech recognition dictionary. Preferably, allophonic transcriptions of the same word are associated with the same label which may be an orthography or other means of identifying the transcription set.

The speech recognition dictionary created by the method described above may be integrated into a speech enabled system. In a preferred embodiment, the speech recognition dictionary created by the above method and apparatus is speaker independent and may be used in systems such as voice activated dialing, credit card identification and others.

In another preferred embodiment, the speech recognition dictionary created by the above method and apparatus is speaker specific. In this case the training utterances would be collected from the end user of the system and only 2 or three utterances would be required to supply sufficient precision. Optionally, for a user specific dictionary, the training may take place on-line immediately after the orthography and the utterances are received from the user since there is no need to gather training utterances from a plurality of sources. The dictionary would be updated for the next time it is used.

As embodied and broadly described herein the invention is a method for creating a transcription capable of being used to generate an entry in a speech recognition dictionary for a certain word, said method comprising the steps of:

receiving an audio signal derived from an utterance of the certain word;

receiving data representative of an orthographic representation of the certain word;

processing the audio signal and the data representative of the orthographic representation of the certain word to provide a transcription of the certain word;

utilizing the transcription to create an entry in a speech recognition dictionary;

storing the entry on a computer readable medium in a format such that the entry is potentially recognizable by a speech recognition system on a basis of a spoken utterance by a user.

As embodied and broadly described herein the invention provides a machine-readable storage medium containing a program element to direct a computer to generate a transcription capable of being used to generate an entry in a speech recognition dictionary for a certain word, said program element implementing functional blocks, said functional blocks comprising:

a first input for receiving an audio signal derived from an utterance of the certain word;

a second input for receiving an orthographic representation of the certain word;

processing means coupled to said first input and to said second input for processing the audio signal and the orthographic representation of the certain word to provide a transcription of the certain word.

As embodied and broadly described herein the invention provides an apparatus for creating an entry for a certain word in a speech recognition dictionary, said apparatus including:

a first input for receiving a signal derived from an utterance of the certain word;

a second input for receiving data representative of an orthographic representation of the certain word;

processing means for:
a) generating on the basis of the data representative of an orthographic representation of the certain word a data structure representative of different pronunciations of the certain word;
b) generating at least in part on the basis of said data structure an entry in the speech recognition dictionary for the certain word.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention for which reference should be made to the appending claims.

DESCRIPTION OF A PREFERRED EMBODIMENT

Speech recognition systems have been developed in many parts of the world and, although it is difficult to describe a standard recognition system architecture, some characteristics are shared between many of them. A typical speech recognition system, of the type depicted in FIG. 1, generally comprises a device such as a microphone or telephone set 100 to convert the spoken utterance into an electric signal and transmit the signal to a speech processing unit 102. The speech-processing unit 102 can be split into two functional blocks namely a recognition unit 110 and a training unit 104. Alternatively, the training unit 104 may be used off-line and may be omitted from the speech processing unit 102. These two units 110 104 make use of a speech recognition dictionary 108 that stores a set of entries potentially recognisable on the basis of a spoken utterance. The training unit 104 receives input data elements 112 in the form of speech tokens, orthographies or others and processes them in order to generate entries suitable to be recognised by the recognition unit 110. These entries are stored in the speech recognition dictionary 108. The speech recognition unit 110 tries to match the detected speech signal with entries made in the speech recognition dictionary 108 and selects the entry that is the most likely to be what the user is saying. The operation of the speech recognition units and the design of speech recognition dictionaries are well known in the art to which this invention pertains. For more information about speech recognition units and dictionaries, the reader is invited to consult the following patents and articles whose contents are hereby incorporated by reference.

U.S. PATENTS

| PATENT # | INVENTOR |
|---|---|
| 5,488,652 | Gregory, J. Bielby et al. |
| 4,164,025 | Dubnowski et al. |
| 4,751,737 | Gerson et al. |
| 4,797,910 | Daudelin |
| 4,959,855 | Daudelin |
| 4,979,206 | Padden et al. |
| 5,050,215 | Nishimura |
| 5,052,038 | Shepard |
| 5,091,947 | Ariyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,695 | Green |
| 5,307,444 | Tsuboka |
| 5,086,479 | Takenaga et al. |

OTHER ART

| TITLE | AUTHOR | SOURCE |
|---|---|---|
| Dynamic Adaptation of Hidden Markov Model for Robust Speech Recognition | | 1989, IEEE International Symposium on Circuits and Systems, vol. 2, May 1989 pp. 1338–1339 |
| Unleashing The Potential of Human-To-Machine Communication | Labov and Lennig, | Telesis, Issue 97, 1993, pp. 23–27 |
| An introduction To Hidden Markov Models | Rabiner and Juang | IEEE ASSP Magazine, Jan. 1986, pp. 4–16 |
| Putting Speech Recognition to Work in The Telephone Network | Lennig, | Computer, published by IEEE Computer Society, vol. 23, No. 8, Aug. 1990 |

Figure 1:
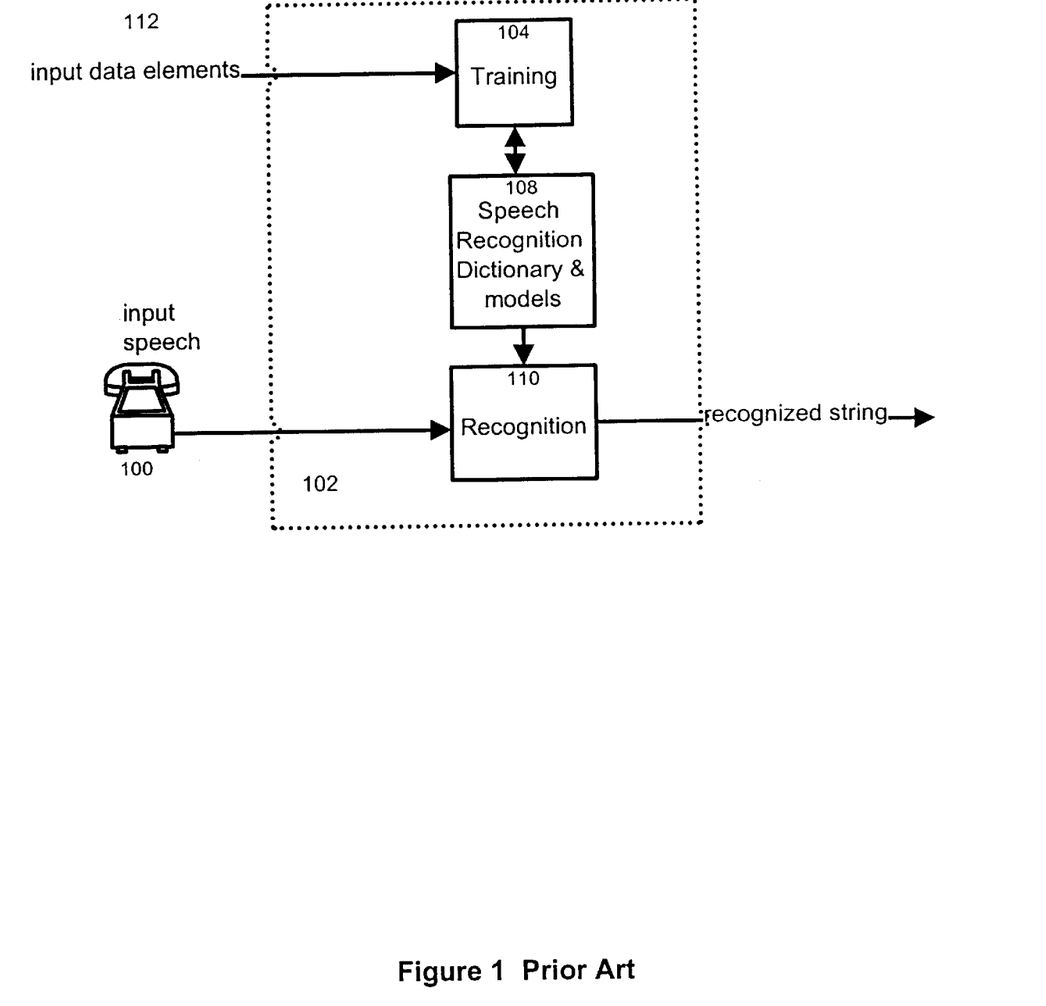
FIG. 1 shows a simplified functional block diagram of a speech recognition system.

Typically, a speech recognition dictionary 108 comprises entries such as orthographies and transcriptions.

Traditionally, to get an accurate transcription of a spoken word, an expert phonetician listens to the speech tokens of the word and transcribes them. This operation is time consuming and the labour costs associated with the expert phoneticians are significant. Furthermore, the transcriptions obtained depend significantly on the phonetician and are highly susceptible to human error. As a result numerous systems providing automatic transcriptions of spoken words have been developed.

In speech applications, the training unit 104 creates entries for the speech recognition dictionary 108. Typically, to add entries to the speech recognition dictionary, sample training utterances of a new word are provided along with a textual representation of that word as input data elements 112. Based on these sample training utterances, the training unit 104 generates entries which are stored in the speech recognition dictionary 108 and used for recognition purposes at a later time. One approach used by the training unit 104 involves generating a transcription for each spoken utterance and storing the transcriptions so generated in the speech recognition dictionary 108. A problem with this approach is that the computational cost of the recognition stage is very high since, for each word, the speech recognition module 110 must score multiple entries in the dictionary. This method also results in speaker specific transcriptions which do not perform well for other users of the system. Another approach commonly used by the training unit 104 is to take the series of separate alternative transcriptions of the new word and select a single transcription which best represents all the utterances. However, the selected transcription merely reflects the acoustic information in the utterance from which the transcription originated, and disregards the acoustic information of the utterances associated with the transcriptions that were rejected during the selection process.

The present invention provides in a preferred embodiment an apparatus that creates a representation of possible ways of pronouncing a new word using linguistic rules and uses a set of utterances of the new word to score the representation in order to derive improved transcriptions of a new word. The most preferred embodiment of this invention makes use of an allophonic graph representing possible ways of pronouncing a word and scores each branch in the graph based on a set of training utterances. The system allows the creation of transcriptions that contain acoustic information originating from a plurality of utterances.

Figure 2:
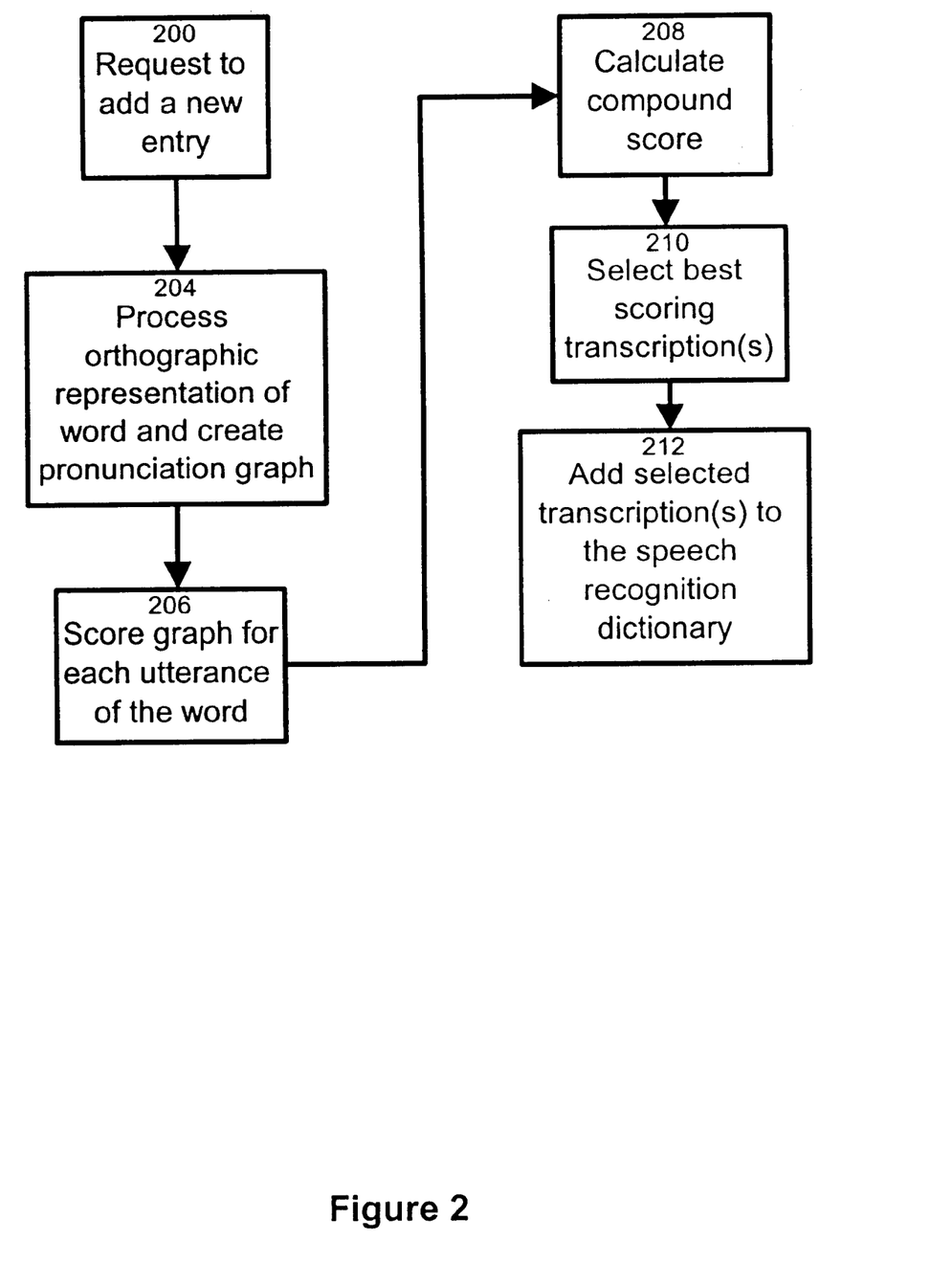
FIG. 2 shows a flow chart of a method in accordance with the invention for creating an entry in a speech recognition dictionary.

In a most preferred embodiment of this invention, the apparatus to add a new entry to a speech recognition dictionary is used to create a speech recognition dictionary suitable for use in a speech recognition system. Preferably, the creation of the speech recognition dictionary is performed when the speech recognition system is off-line. In a typical interaction, as shown in FIG. 2, the system first receives a request to add a new entry 200 to the speech recognition dictionary. The request includes an a orthographic representation of the word to be added along with multiple utterances of the word. The system processes the orthographic representation of the word to generate a pronunciation graph 204, herein referred to as allophonic graph, representing possible pronunciations of the word. Preferably, each branch in the graph is associated to an allophone. However, other sub-word units may be used without detracting from the spirit of the invention. Following this, each branch of the graph is scored 206 using the input training utterances. Any algorithm suitable for scoring a graph may be used here without detracting from the spirit of the invention. In a preferred embodiment, a graph search algorithm is used such as the one presented in V. N. Gupta et al. "Fast search strategy in a large vocabulary word recognizer", JASA 84(6), pp.2007–2017, Dec. 1988. The content of the above document is hereby incorporated by reference. Using the methods presented in the above document, each branch in the graph is assigned a branch log likelihood score for each training utterance. Once a branch in the graph has been assigned a score for each input training utterance, a compound score for each branch is computed 208 by combining the score for each individual utterance. In a preferred embodiment, the log likelihood scores associated to a branch are summed to create the compound score for the branch. Following this, the top L scoring transcriptions are selected 210 on the basis of a high likelihood score. The likelihood associated to a particular transcription is the sum of the compound scores along the path in the scored allophonic graph. Selecting top scoring transcriptions in a graph is well known in the art to which this invention pertains. The reader is invited to consult V. N. Gupta et al. "Fast search strategy in a large vocabulary word recognizer", JASA 84(6), pp.2007–2017, Dec. 1988 for more information about the topic. The content of the above document is hereby incorporated by reference. As a last step, the L transcriptions selected at step 210 are introduced in the speech recognition dictionary 212. In a preferred embodiment, a single allophonic transcription (L=1) is added for each new word the transcription having obtained the highest likelihood score. Preferably, each transcription in the speech recognition dictionary is associated to a label such as an orthography. In a preferred embodiment, each label in the speech recognition dictionary is in turn associated to a link allowing the desired action associated to the label to be completed upon selection of a transcription associated to the label by a speech recognition system. In the example of a voice activated dialing system, the link may be a pointer to a data structure containing the telephone number of the entity associated with the label. The system then outputs the telephone number that can be released to the user or be automatically dialed. The link may also be an action link that identifies an action to be taken. For example in a system designed to effect a certain procedure in response to a spoken command, the link designates the action to be performed. This designation may be direct in which case the link contains the information identifying the action, or indirect where the link points to a location containing the information identifying the action. In a specific example, the speech recognition system may be used to operate components on the basis of spoken commands. For instance the user may say "lights on" to indicate that the lighting in a room is to be activated. The action link in this case identifies the specific action to be taken. The link may be a data element that contains the information to the effect that the lights should be activated or it may be a pointer to a table containing the entire list of possible actions that the system can effect, the pointer identifying the entry in the table corresponding to the light activation. Thus, for the purposes of this specification, the expression "link" should be interpreted in a broad manner to designate the structure that constitutes an operative relationship between a label and the desired action that is to be performed when a transcription associated with the label is selected by the speech recognition system as a likely match to the spoken utterance.

Figure 3:
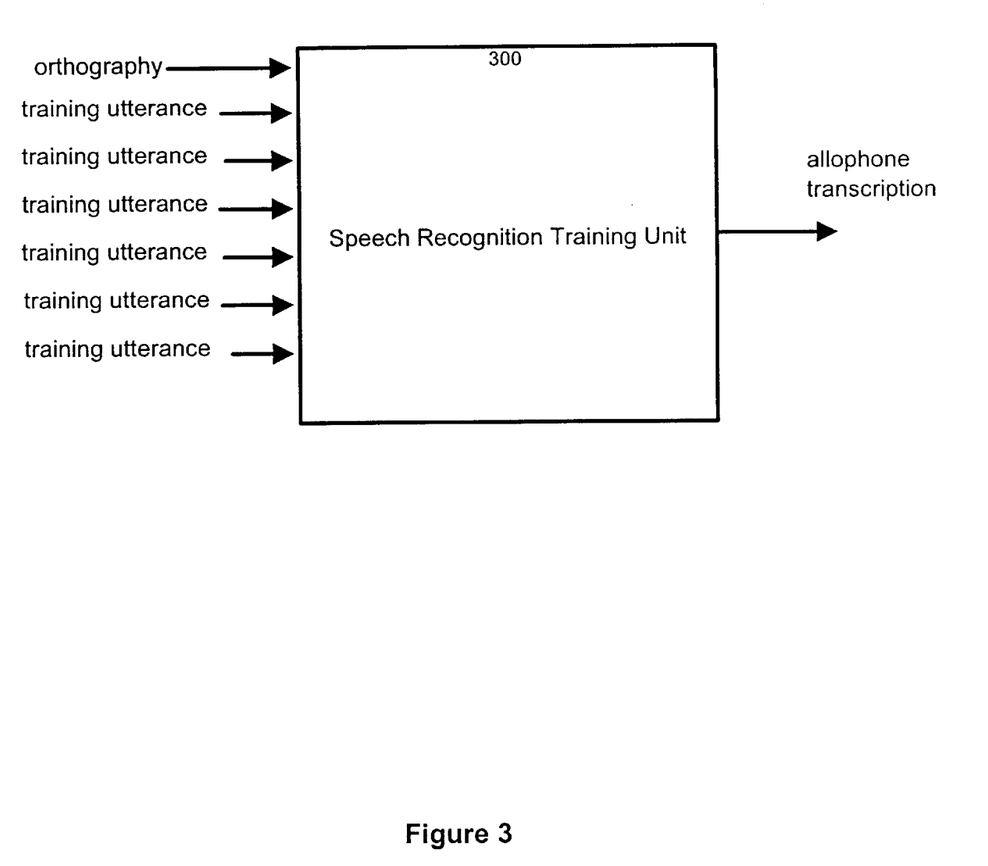
FIG. 3 shows a high level block diagram of a training unit in accordance with the present invention.

The training unit is shown in block form in FIG. 3. Essentially a training unit 300 receives several utterances of the same word along with the word's orthographic representation and generates transcriptions of these utterances. In a preferred embodiment, a single allophonic transcription is generated for each orthography. Other transcription types such as phonemic transcriptions and others may be used here without departing from the spirit of the invention. The orthographic representation may be obtained from a dictionary unit comprising orthographic representations of words or from a user of the training system through a keyboard or other suitable data input means. The dictionary training system may be used to train a speaker independent dictionary or a speaker specific dictionary. To train a speaker independent dictionary, the input training utterances may be collected from a pool of speakers specifically for the purpose of training the speech recognition dictionary. Preferably, for each new word, 10 to 20 training utterances are used. Fewer or more training utterances may be used here without detracting from the spirit of the invention. Using speakers from both genders and with accents representative of the end users of the system typically provide the best results. Each speaker enters a series of utterances of predetermined words. To train a speaker specific dictionary, the input training utterances are collected from the end user of the speech recognition system and the training may be performed when the speech recognition module is on-line. Preferably, about 2 or 3 training utterance are used. Fewer or more training utterances may be used here without detracting from the spirit of the invention. Once the utterances are collected, they may be stored on a computer readable medium such as a hard drive or other non-volatile storage medium as speech tokens along with the orthographic representation of their associated word. Alternatively, the orthographic representation of the word may be stored separately from the training utterance with a link associating the two. The orthographic representation of the word along with the training utterances with which it is associated constitutes a word record. The speech recognition training unit accesses each word record to generate an allophonic transcription most likely to correspond to a spoken utterance of the word.

Figure 4:
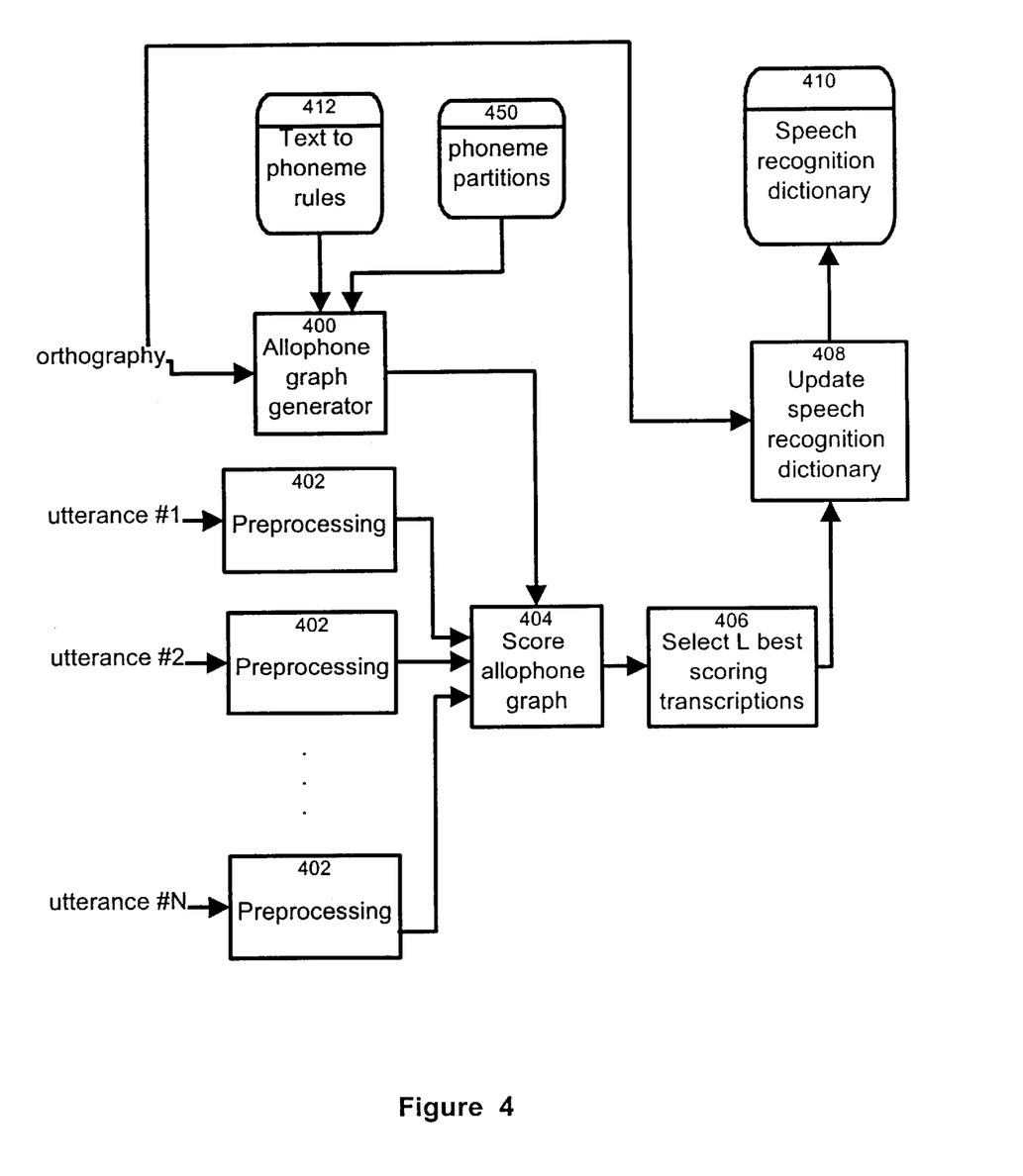
FIG. 4 shows a more detailed block diagram of the training unit of FIG. 3 in accordance with a preferred embodiment of the invention.

The training unit depicted in FIG. 3 is shown in more detail in the block diagram of FIG. 4. In a preferred embodiment, the training unit comprises a number of functional units namely an allophone graph generator 400, a preprocessing unit 402, an allophonic graph scoring module 404, a module to select the top L scores for the graph 406 and a dictionary update unit 408. The training unit also includes a computer readable medium comprising data elements representing text to phoneme rules 412 and phoneme partitions 450. The dictionary update unit 408 of the training unit interacts with the speech recognition dictionary to modify the contents and to introduce new entries.

The allophone graph generator 400 receives as input the orthographic representation of the word to be added, commonly referred to as orthography, as well as text to phoneme rules 412 and the phoneme partitions 450. Alternatively, the allophone graph generator 400 may consult the text to phoneme rules 412 using some pre-determined protocol. As a result, the allophone graph generator generates an allophonic graph representing possible pronunciations of the orthography received. In a preferred embodiment, the text to phoneme rules are stored on a computer readable medium in the form of a data structure allowing a mapping between a letter and a phoneme. There are many types of letter to phoneme transcription methods that may be used here such as "Modeling Pronunciation Variation for ASR: Overview and Comparison of methods", Helmer Strik and Catia Cucchiarini, Workshop Modeling Pronunciation Variation, Rolduc, 4–6 May 1998 and "Maximum Likelihood Modelling of Pronunciation Variation", Trym Holter and Torbjorn Svendsen, Workshop Modeling Pronunciation Variation, Rolduc, 4–6 May 1998, pp.63–66 whose contents are hereby incorporated by reference.

Optionally, the mapping of a given letter may take into account the position of the letters in the orthography of the word as well as the surrounding letters to determine the phoneme associated with the given letter.

Figure 5:
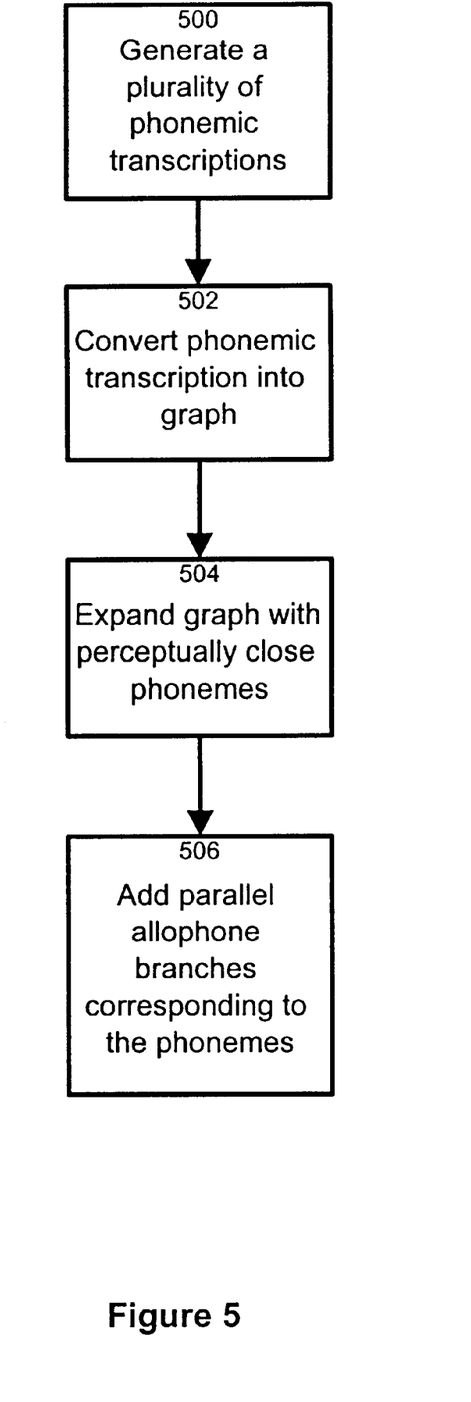
FIG. 5 shows a flow chart of a method for generating an allophonic graph in accordance with the spirit of the invention.

In a preferred embodiment, the task of generating an allophonic graph is performed by a sequence of steps as shown in the flow diagram of FIG. 5. The first step includes generating possible phonemic transcriptions 500 of the new word to be added on the basis of letter to phoneme rules 412 and on the basis of the received orthographic representation. The result of this step is a plurality of phonemic transcriptions representative of possible pronunciations of the new word on the basis of linguistic rules. Alternatively, the phonemic transcriptions may be obtained from a dictionary unit comprising phonemic transcriptions of accepted pronunciations of words. Following this, the second step includes turning the phonemic transcriptions into a graph 502 where each phoneme in the transcription is associated to a branch. The concept of a graph is well known in the art to which this invention pertains. For more information about the graph search, the reader is invited to consult V. N. Gupta et al. "Fast search strategy in a large vocabulary word recognizer", JASA 84(6), pp.2007–2017, Dec. 1988 whose content is hereby incorporated by reference. Preferably each branch in the graph corresponds to one sub-word unit such as a phoneme. Preferably, for each branch in the graph, parallel branches are added 504 representatives of phonemes perceptually close to this phoneme branch. For example, for a branch labeled as phoneme /i/, a parallel branch for the front vowel /I/ is added. Perceptually close phonemes are said to belong to a same partition and the allophone graph generator 400 receives partition information from the phoneme partitions computer readable medium 450. Many types of partitioning are possible and partitions others than the ones presented here do not detract from the spirit of the invention. Three (3) examples of partitions are shown in the table below. For an explanation about the meaning of the symbols in the table below, the reader is invited to consult M. Lennig et al., 1984 "Machine Readable Phonetic Alphabet for English and French", Speech Communication, Vol. 3(1) whose content is hereby incorporated by reference.

| Partition | Phonemes in Partition |
| --- | --- |
| PARTITION #1 | |
| Vowels | i I e E a Y o O u U X x A i: u: y: e! a! X! o! 3* AH |
| Consonants | P t k b d g m n G g! f v s z S Z tC dV r l w H j tS dZ |
| PARTITION #2 | |
| High vowels | I I y Y u U i: u: y: |
| Non-high vowels | A a a! E 3 x X X! AH * o o! O e e! |
| Sonorant consonants | M n G g! r l w H j |
| Fricatives | s z tC dV S Z f v tS dZ |
| Stops (oral) | b d g p t k |
| PARTITION #3 | |
| High front vowels | i I y Y i: y: |
| High back vowels | u U u: |
| mid vowels (rounded) | o o! O x X X! AH |
| mid vowels (unrounded) | E 3 * e e! |
| Low vowels | A a a! |
| Glides | j w H |

| Partition | Phonemes in Partition |
|---|---|
| Liquids | l r |
| Nasal consonants | m n g! G |
| Voiceless fricatives | f s S tC tS |
| Voiced fricatives | v z Z dV dZ |
| Voiced stops | b d g |
| Voiceless stops | p t k |

For example, if partition #2 is selected and a branch is associated with phoneme /b/, then branches with phonemes /d/, /g/, /p/, /t/ and /k/ will be added in parallel. Alternatively, if partition #3 is selected, then a branch with phoneme /b/ will have branches with phonemes /d/ and /g/ added in parallel. Following this, each phonemic branch is expanded by replacing it by its corresponding allophones in parallel 506. Alternatively, step 504 is omitted and only the original phonemes are present in the graph.

Figure 6A:
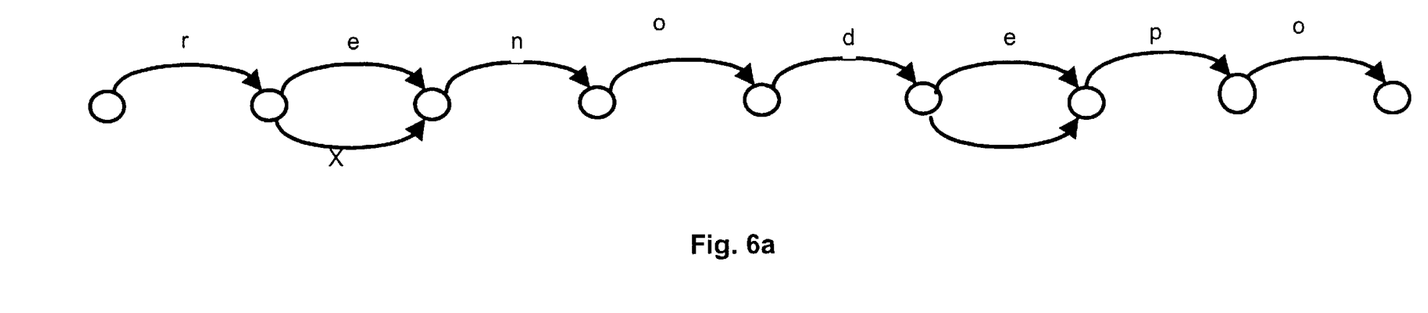
FIGS. 6a and 6b show phonemic graphs in accordance with the spirit of the invention for the word Réno-Dépôt™.
Figure 6B:
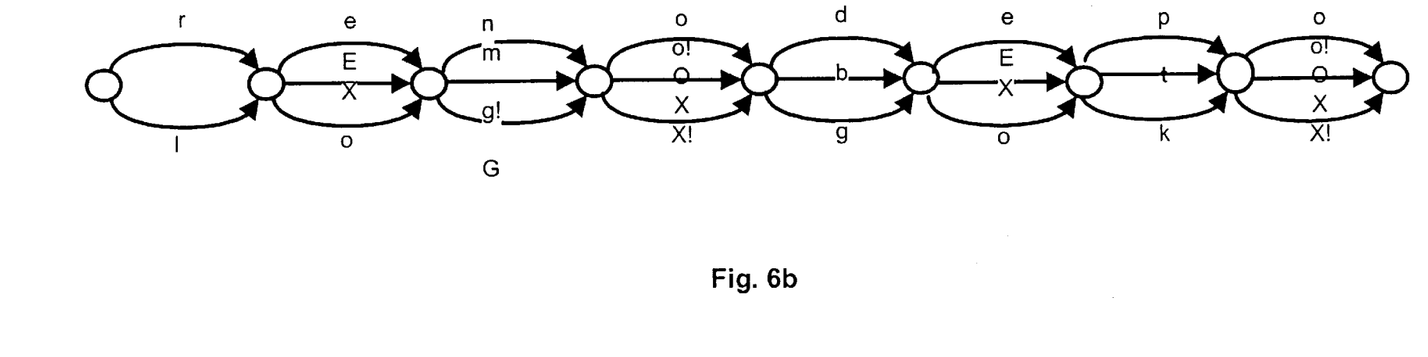

A specific example will better illustrate the functioning of the allophonic graph generator 400. The orthography received by the allophonic graph generator is "Réno-Dépôt™". In the first step 500, a set of phonemic transcriptions are generated namely "re-no-de-po", "re-no-dX-po", "rX-no-de-po" and "rX-no-X-po" on the basis of letter to phoneme rules. The phonemic transcriptions are then converted into a graph 502 as shown in FIG. 6a. As shown in the figure, the arrows are branches representing phoneme sub-word units and the circles are states. Once the graph has been created it is expanded 504 by adding parallel branches representatives of phonemes perceptually close to each phoneme branch as shown in FIG. 6b. In this example another partition than those shown in the above table has been used. Following this, each branch is replaced by parallel branches representative of the allophones.

In a preferred embodiment, the purpose of a typical pre-processing module 402, is to translate the incoming signal into a form that will facilitate speech recognition and speech processing. The training utterances may be processed simultaneously by parallel pre-processing modules 402 as shown in the illustration of FIG. 4 or they may be processing sequentially without detracting from the spirit of the invention. Variations in the pre-processing unit are numerous and methods other than the one presented below do not detract from the spirit of the invention provided the utterances are put into a form that allows the system to compute a likelihood score. Typically, feature vectors are created on the basis of mathematical computations. In a preferred embodiment, the pre-processing stage translates the incoming signal into mel-based cepstral parameters. These processing methods are well known in the art to which this invention pertains. The reader is invited to consult O'Shaughnessy D. (1990) "Speech Communication: Human and Machine", Addison-Wesley. Addison-Wesley series in Electrical Engineering: Digital Signal Processing, whose content is hereby incorporated by reference.

The allophonic graph created by the allophonic graph generator 400 and the training utterance processed by the pre-processing unit 402 are the input of the allophonic graph scoring module 404. The feature vectors for each utterance are used to score the allophonic graph generated on the basis of the orthographic representation of the new word. Preferably a graph search algorithm is used to score the graph. For more information about a graph search, the reader is invited to consult V. N. Gupta et al. "Fast search strategy in a large vocabulary word recognizer", JASA 84(6), pp.2007–2017, Dec. 1988 whose content is herein incorporated by reference. Using the methods presented in the above document, each branch in the graph is assigned a branch log likelihood score for each training utterance. Once a branch in the graph has been assigned a score for each input training utterance, a compound score for each branch is computed by combining the score for each individual utterance. In a preferred embodiment, the log likelihood scores associated to a branch are summed to create the compound score for the branch. For example, the branch $B^{nm}_k$, where k is the index of the branch, in the transition from state $S_n$ to $S_m$ has log likelihood scores $P^{k,nm}_1$, $P^{k,nm}_2$ and $P^{k,nm}_3$ for utterances $U_1$, $U_2$ and $U_3$ respectively. The compound log likelihood score for the branch $B^{nm}_k$ is $P^{k,nm}_1 + P^{k,nm}_2 + P^{k,nm}_3$. Following this, the top L scoring allophonic transcriptions are selected 406 on the basis of a high likelihood score. The likelihood associated to a particular allophonic transcription is the sum of the compound log likelihood scores along the path in the scored allophonic graph. Selecting top scoring transcriptions in a graph is well known in the art to which this invention pertains.

As a last step, the L allophonic transcriptions selected at step 406 are introduced in to the speech recognition dictionary 410. In a preferred embodiment, a single allophonic transcription (L=1) is added for each new word the allophonic transcription having obtained the highest likelihood score. Preferably, each transcription in the speech recognition dictionary is associated to a label such as an orthography. The allophonic transcription generated is representative of acoustic information of all the training utterances.

Alternatively, after the graph has been scored, it is processed to find the N-best scores among all the branches in the unified graph. Following this, a detailed acoustic model re-scores the candidates in the N-best list. In the preferred embodiment the Viterbi algorithm is used to re-score the N-best list. The L best scoring allophonic transcriptions are then identified and added to the speech recognition dictionary, where L is the number of transcriptions stored for a new word and where L≦N. For example, if only one transcription is desired for each new word, L is set to one (1).

In another preferred embodiment, the apparatus for adding a new entry to a speech recognition dictionary is used in a dictionary training system by adding multiple allophonic transcriptions of a new word. In a typical interaction, for each new word, the dictionary training system receives as input an orthographic representation of the word to be added along with utterances representative of the word. Using clustering techniques, the utterances are grouped and each group is processed separately. Clustering can be done automatically using the k-means algorithm or other well-known clustering algorithm. Clustering is well known in the art to which this invention pertains. Alternatively, heuristic clustering methods may also be used to divide the utterances into groups. Examples of heuristic clustering include separating utterances using male/female classification, native/non-native classification and so on. Preferably, for each group or cluster, 10 to 20 utterances are used, herein referred to as training utterances. For each cluster, the allophonic graph generated on the basis of the orthographic representation of the new word is scored and for each cluster the top L scoring allophonic transcriptions are selected. The clustering process results in multiple allophonic transcriptions for each word. In a preferred embodiment a single allophonic transcription is selected (L=1) for each cluster.

Figure 7:
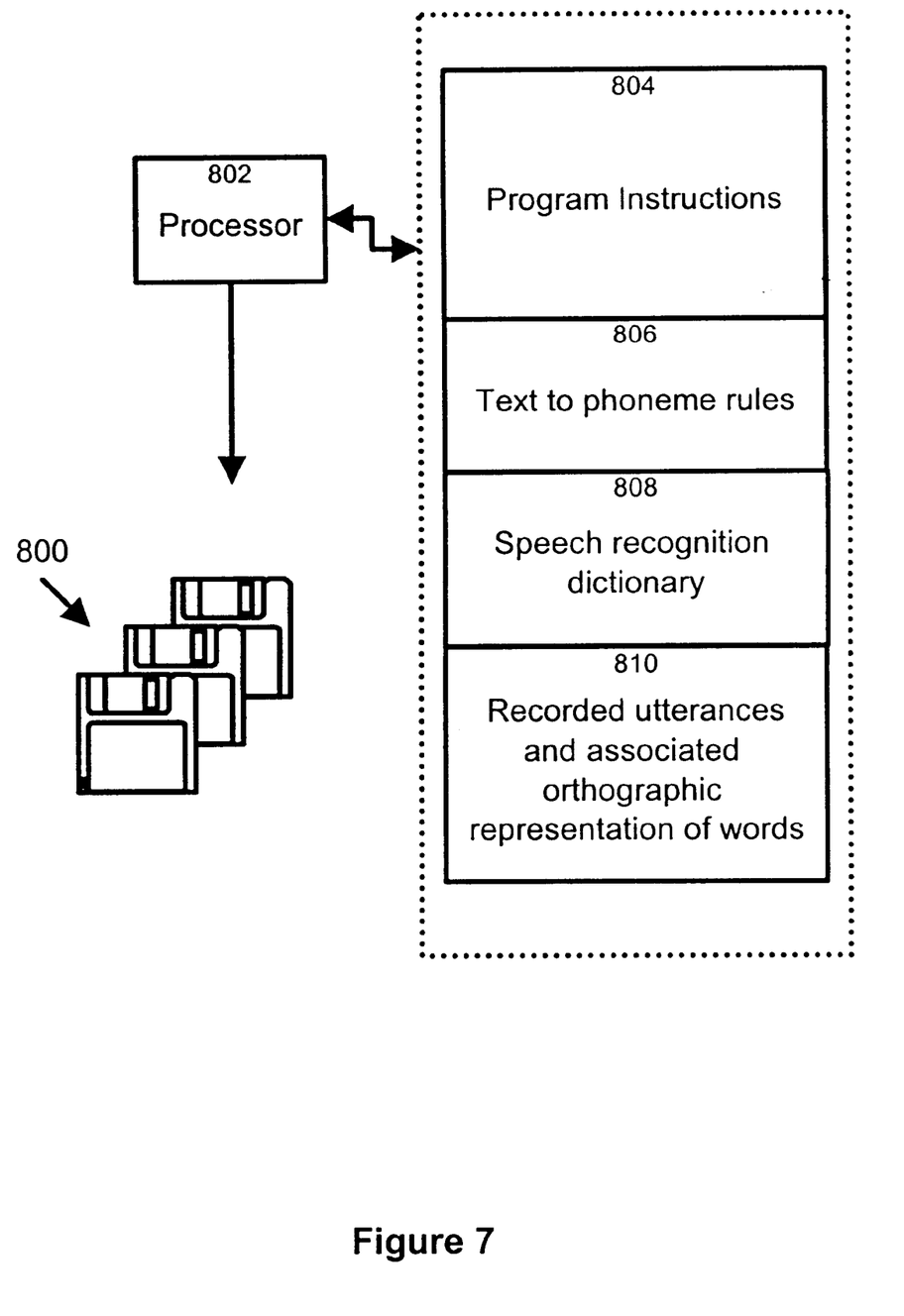
FIG. 7 is a block diagram of an apparatus in accordance with the invention for performing the training of the speech recognition dictionary in accordance with the invention.

The above-described method for creating an entry in a speech recognition dictionary can be implemented on any suitable computing platform as shown in FIG. 7. Such computing platform typically includes a CPU 802 and a memory 800 connected to the CPU by a data communication bus. The memory 800 stores the data 806 808 810 and the instructions of the program 804 implementing the functional blocks depicted in the drawings and described in the specification. That program 804 operates on the data 806 808 810 in accordance with the algorithms described above to generate the entry in the speech recognition dictionary based on a plurality of spoken training utterances of the same word and on an orthographic representation of the word.

Although the present invention has been described in considerable detail with reference to certain preferred embodiments thereof, variations and refinements are possible without departing from the spirit of the invention as have been described throughout the document. The methods described above may also be applied to combination of words without detracting from the spirit of the invention. Therefore, the scope of the invention should be limited only by the appended claims and their equivalents.

What is claimed is:

1. An apparatus for creating a transcription capable of being used to generate an entry in a speech recognition dictionary for a certain word, said apparatus comprising:
    a first input for receiving a set of audio signals derived from respective utterances of the certain word;
    a second input for receiving a data element representative of an orthographic representation of the certain word;
    a processing unit coupled to said first input and to said second input for processing the set of audio signals and the data element to provide a transcription of the certain word, the transcription of the certain word combining acoustic information originating from at least two audio signals of said set of audio signals.

2. An apparatus as defined in claim 1, wherein said processing unit is operative for generating at least in part on the basis of the data element a data structure representative of different pronunciations of the certain word.

3. An apparatus as defined in claim 2, wherein said data structure is a graph having branches, each branch of said graph being associated with a certain acoustic symbol.

4. An apparatus as defined in claim 3, wherein said certain acoustic symbol is a phoneme.

5. An apparatus as defined in claim 3, wherein said processing unit is operative for processing the data structure and the set of audio signals to generate the transcription.

6. An apparatus as defined in claim 3, wherein said processing unit is operative for scoring said graph on the basis of said set of audio signals to compute a likelihood score and generate a transcription on the basis of the likelihood score.

7. An apparatus as defined in claim 2, wherein said processing unit is operative for generating a plurality of transcriptions on the basis of the data element representative of an orthographic representation of the certain word.

8. An apparatus as defined in claim 7, wherein said processing unit is operative for generating a graph on the basis of said plurality of transcriptions, said graph being representative of different pronunciations of the certain word.

9. An apparatus as defined in claim 1, wherein the utterances are vocally expressed by the same individual.

10. An apparatus as defined in claim 1, wherein the utterances are vocally expressed by different individuals.

11. An apparatus as defined in claim 1, wherein said processing unit is operative for grouping the utterances of the certain word into utterance clusters on the basis of acoustic properties of the utterances.

12. An apparatus as defined in claim 11, wherein said processing unit is operative for generating a transcription of the certain word for each utterance cluster.

13. An apparatus as defined in claim 1, wherein said processing unit is operative for grouping into utterance clusters the utterances of the certain word on the basis of heuristic properties of the utterances.

14. An apparatus as defined in claim 13, wherein said processing unit is operative for generating a transcription of the certain word for each utterance cluster.

15. A method for creating a transcription capable of being used to generate an entry in a speech recognition dictionary for a certain word, said method comprising the steps of:
    receiving a set of audio signals derived from respective utterances of the certain word;
    receiving a data element representative of an orthographic representation of the certain word;
    processing the set of audio signals and the data element to provide a transcription of the certain word, the transcription of the certain word combining acoustic information originating from at least two audio signals of said set of audio signals;
    utilizing the transcription to create an entry in a speech recognition dictionary implemented on a computer readable medium.

16. A method as defined in claim 15, wherein said processing step comprises the step of generating at least in part on the basis of the the data element a data structure representative of different pronunciations of the certain word.

17. A method as defined in claim 16, wherein said data structure is a graph having branches, each branch of said graph being associated with a certain acoustic symbol.

18. A method as defined in claim 17, wherein said certain acoustic symbol is a phoneme.

19. A method as defined in claim 18, wherein said processing step includes the step of processing the data structure and the set of audio signals to generate the transcription.

20. A method as defined in claim 17, wherein said processing step includes the step of:
    scoring said graph on the basis of said set of audio signals to generate a likelihood score and generate a transcription on the basis of the likelihood score.

21. A method as defined in claim 16, said method further comprising the step of generating a plurality of transcriptions on the basis of the data element representative of an orthographic representation of the certain word.

22. A method as defined in claim 21, said method further comprising the step of generating a graph on the basis of said plurality of transcriptions, said graph being representative of different pronunciations of the certain word.

23. A method as defined in claim 15, wherein the utterances are vocally expressed by the same individual.

24. A method as defined in claim 15, wherein the utterances are vocally expressed by different individuals.

25. A method as defined in claim 15, wherein said processing step includes the step of grouping the utterances of the certain word into utterance clusters on the basis of acoustic properties of the utterances.

26. A method as defined in claim 25, said method further comprising generating a transcription of the certain word for each utterance cluster.

27. A method as defined in claim 15, said method further comprising the step of grouping into utterance clusters the utterances of the certain word on the basis of heuristic properties of the utterances.

28. A method as defined in claim 27, said method comprising generating a transcription of the certain word for each utterance cluster.

29. A machine-readable storage medium containing a program element to direct a computer to generate a transcription capable of being used to generate an entry in a speech recognition dictionary for a certain word, said program element implementing functional blocks, said functional blocks comprising:

- a first input for receiving a set of audio signals derived from respective utterances of the certain word;
- a second input for receiving a data element representative of an orthographic representation of the certain word;
- a processing unit coupled to said first input and to said second input for processing the set of audio signals and the data element to provide a transcription of the certain word, the transcription of the certain word combining acoustic information originating from at least two audio signals of said set of audio signals.

30. A machine-readable storage medium as defined in claim 29, wherein said processing unit is operative for generating at least in part on the basis of the data element a data structure representative of different pronunciations of the certain word.

31. A machine-readable storage medium as defined in claim 30, wherein said data structure is a graph having branches, each branch of said graph being associated with a certain acoustic symbol.

32. A machine-readable storage medium as defined in claim 31, wherein said certain acoustic symbol is a phoneme.

33. A machine-readable storage medium as defined in claim 31, wherein said processing unit is operative for processing the data structure and the set of audio signals to generate the transcription.

34. A machine-readable storage medium as defined in claim 31, wherein said processing unit is operative for scoring said graph on the basis of said set of audio signals to compute a likelihood score and generate a transcription on the basis of the likelihood score.

35. A machine-readable storage medium as defined in claim 30, wherein said processing unit is further operative for generating a plurality of transcriptions on the basis of the data element representative of an orthographic representation of the certain word.

36. A machine-readable storage medium as defined in claim 35, wherein said processing unit is further operative for generating a graph on the basis of said plurality of transcriptions, said graph being representative of different pronunciations of the certain word.

37. A machine-readable storage medium as defined in claim 29, wherein the utterances are vocally expressed by the same individual.

38. A machine-readable storage medium as defined in claim 29, wherein the utterances are vocally expressed by different individuals.

39. A machine-readable storage medium as defined in claim 29, wherein said processing unit is operative for grouping the utterances of the certain word into utterance clusters on the basis of acoustic properties of the utterances.

40. A machine-readable storage medium as defined in claim 39, wherein said processing unit is operative for generating a transcription of the certain word for each utterance cluster.

41. A machine-readable storage medium as defined in claim 29, wherein said processing unit is operative for grouping into utterance clusters the utterances of the certain word on the basis of heuristic properties of the utterances.

42. A machine-readable storage medium as defined in claim 41, wherein said processing unit is operative for generating a transcription of the certain word for each utterance cluster.

43. An apparatus for creating an entry for a certain word in a speech recognition dictionary, said apparatus including:

- a first input for receiving a set of audio signals derived from respective utterances of the certain word;
- a second input for receiving a data element representative of an orthographic representation of the certain word;
- a processing unit operative for:
  a) generating on the basis of the data element a data structure representative of different pronunciations of the certain word;
  b) processing the data structure on a basis of the set of audio signals to derive a transcription of the certain word, the transcription of the certain word combining acoustic information originating from at least two signals of said set of audio signals;
  c) generating at least in part on the basis of said transcription an entry in the speech recognition dictionary for the certain word.

44. An apparatus as defined in claim 43, wherein said data structure is a graph having branches, each branch of said graph being associated with a certain acoustic symbol.

45. An apparatus as defined in claim 44, wherein said certain acoustic symbol is a phoneme.

46. An apparatus as defined in claim 44, wherein said processing unit is operative for scoring said graph on the basis of the set of audio signal to compute a likelihood score and generate a transcription on the basis of the likelihood score.

47. An apparatus as defined in claim 43, wherein said processing unit is further operative for generating a plurality of transcriptions on the basis of the data element representative of an orthographic representation of the certain word.

48. An apparatus as defined in claim 47, wherein said processing unit is further operative for generating a graph on the basis of said plurality of transcriptions, said graph being representative of different pronunciations of the certain word.

49. An apparatus as defined in claim 43, wherein the utterances are vocally expressed by the same individual.

50. An apparatus as defined in claim 43, wherein the utterances are vocally expressed by different individuals.

51. An apparatus as defined in claim 43, wherein said processing unit is operative for grouping the utterances of the certain word into utterance clusters on the basis of acoustic properties of the utterances.

52. An apparatus as defined in claim 51, wherein said processing unit is operative for generating a transcription of the certain word for each utterance cluster.

53. An apparatus as defined in claim 43, wherein said processing unit is operative for grouping into utterance clusters the utterances of the certain word on the basis of heuristic properties of the utterances.

54. An apparatus as defined in claim 53, wherein said processing unit is operative for generating a transcription of the certain word for each utterance cluster.

* * * * *